(12) United States Patent
Ferguson

(10) Patent No.: US 7,771,181 B2
(45) Date of Patent: Aug. 10, 2010

(54) GASKET MOLDING SYSTEM FOR MEMBRANE ELECTRODE ASSEMBLIES

(75) Inventor: Dennis E. Ferguson, Mahtomedi, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 1060 days.

(21) Appl. No.: 11/272,887

(22) Filed: Nov. 14, 2005

(65) Prior Publication Data

US 2007/0108657 A1 May 17, 2007

(51) Int. Cl.
B29C 45/14 (2006.01)
(52) U.S. Cl. .................... 425/116; 425/125
(58) Field of Classification Search ............ 425/116, 425/125; 264/252; 429/35, 36
See application file for complete search history.

(56) References Cited

U.S. PATENT DOCUMENTS

| 2,137,472 | A | * | 11/1938 | Forbes | 425/116 |
|---|---|---|---|---|---|
| 2,304,984 | A | * | 12/1942 | Wood | 264/275 |
| 3,320,092 | A | | 5/1967 | Uline | |
| 3,607,418 | A | | 9/1971 | Ortlieb et al. | |
| 4,880,669 | A | | 11/1989 | Dorn et al. | |
| 5,187,025 | A | | 2/1993 | Kelland et al. | |
| 5,406,699 | A | * | 4/1995 | Oyama | 29/827 |
| 5,510,069 | A | | 4/1996 | Schuppler et al. | |
| 5,648,105 | A | * | 7/1997 | Shimazu et al. | 425/139 |
| 6,057,054 | A | | 5/2000 | Barton et al. | |
| 6,080,503 | A | | 6/2000 | Schmid et al. | |
| 6,120,274 | A | * | 9/2000 | Gerig et al. | 425/116 |
| 6,231,053 | B1 | | 5/2001 | Wakamatsu | |
| 6,554,598 | B1 | * | 4/2003 | Tsuruta | 425/89 |
| 6,720,103 | B1 | | 4/2004 | Nagai | |
| 6,840,969 | B2 | | 1/2005 | Kobayashi et al. | |
| 6,866,272 | B2 | * | 3/2005 | Andou et al. | 277/650 |
| 2001/0019791 | A1 | | 9/2001 | Gooch et al. | |
| 2002/0034670 | A1 | * | 3/2002 | Suenaga et al. | 429/30 |
| 2003/0082430 | A1 | | 5/2003 | Suzuki | |
| 2003/0104262 | A1 | * | 6/2003 | Kuroki et al. | 429/36 |
| 2003/0194526 | A1 | | 10/2003 | Vesley et al. | |
| 2003/0211378 | A1 | | 11/2003 | Wald et al. | |
| 2004/0018412 | A1 | | 1/2004 | Orsbon et al. | |
| 2004/0160019 | A1 | | 8/2004 | Williams et al. | |
| 2004/0241525 | A1 | | 12/2004 | Mekala et al. | |
| 2005/0031935 | A1 | | 2/2005 | Dave | |
| 2005/0142414 | A1 | * | 6/2005 | Kimura et al. | 429/34 |

FOREIGN PATENT DOCUMENTS

EP 1 223 629 A1 7/2002

OTHER PUBLICATIONS

U.S. Appl. No. 10/961,263, filed Oct. 8, 2004. "Curable Subgasket for a Membrane Electrode Assembly", now pending.
U.S. Appl. No. 11/229,902, filed Sep. 19, 2005, "Gasketed Subassembly for Use in Fuel Cells", now pending.

* cited by examiner

*Primary Examiner*—Robert B Davis
(74) *Attorney, Agent, or Firm*—Brian R. Morrison; Philip Y. Dahl

(57) ABSTRACT

The present invention is a system for molding a gasket to a membrane electrode assembly. The system comprises a cavity defined at least in part by closable mold blocks, at least one injection gate for injecting gasket material into the cavity, a mount for retaining the membrane electrode assembly adjacent to the cavity, and a mold insert independently movable relative to the closable mold blocks for applying pressure to the membrane electrode assembly retained on the mount.

14 Claims, 5 Drawing Sheets

GASKET MOLDING SYSTEM FOR MEMBRANE ELECTRODE ASSEMBLIES

FIELD OF THE INVENTION

The present invention relates to membrane electrode assemblies for use in electrochemical devices, such as fuel cells. In particular, the present invention relates to systems for molding gaskets to membrane electrode assemblies.

BACKGROUND OF THE INVENTION

Fuel cells are electrochemical devices that produce usable electricity by the catalyzed combination of a fuel such as hydrogen and an oxidant such as oxygen. In contrast to conventional power plants, such as internal combustion generators, fuel cells do not utilize combustion. As such, fuel cells produce little hazardous effluent. Fuel cells convert hydrogen fuel and oxygen directly into electricity, and can be operated at higher efficiencies compared to internal combustion generators. Because individual fuel cells do not produce much energy (e.g., between about 0.7-0.9 volts), multiple fuel cells may be arranged together in a stack to generate enough electricity to operate motor vehicles and supply electricity to remote locations.

A fuel cell, such as a proton exchange membrane (PEM) fuel cell, typically contains a membrane electrode assembly (MEA) formed by a catalyst coated membrane disposed between a pair of gas diffusion layers. The catalyst coated membrane itself typically includes an electrolyte membrane disposed between a pair of catalyst layers. The respective sides of the electrolyte membrane are referred to as an anode portion and a cathode portion. In a typical PEM fuel cell, hydrogen fuel is introduced into the anode portion, where the hydrogen reacts and separates into protons and electrons. The electrolyte membrane transports the protons to the cathode portion, while allowing a current of electrons to flow through an external circuit to the cathode portion to provide power. Oxygen is introduced into the cathode portion and reacts with the protons and electrons to form water and heat.

MEAs are typically sealed with gaskets to prevent pressurized gases and liquids from escaping. To ensure that the pressurized gases and liquids do not bypass the electrolyte membranes, the gaskets are generally molded around the peripheral edges of the MEAs. However, a common issue with gasket molding systems is that the systems may over-compress or under-compress the MEAs. Over-compression may cause the anode portions and the cathode portions of the MEAs to contact through the respective electrolyte membranes, resulting in electrical shorts. Alternatively, under-compression may result in gasket materials being molded in undesirable locations around the MEAs. Accordingly, there is a need for a gasket molding system that reduces the risk of over-compressing and under-compressing MEAs during gasket molding operations.

BRIEF SUMMARY OF THE INVENTION

The present invention relates to a system for molding a gasket to an MEA. The system includes a mold cavity defined at least in part by closable mold blocks, and at least one injection gate for injecting gasket material into the mold cavity. The system further includes a mount for retaining the MEA adjacent to the mold cavity, and a mold insert independently movable relative to the closable mold blocks for applying pressure to the MEA retained on the mount. The system is capable of providing suitable levels of pressure to MEAs during gasket moldering operations, thereby reducing the risk of over-compression and under-compression.

While the above-identified drawing figures set forth several embodiments of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale. Like reference numbers have been used throughout the figures to denote like parts.

DETAILED DESCRIPTION

Figure 1:
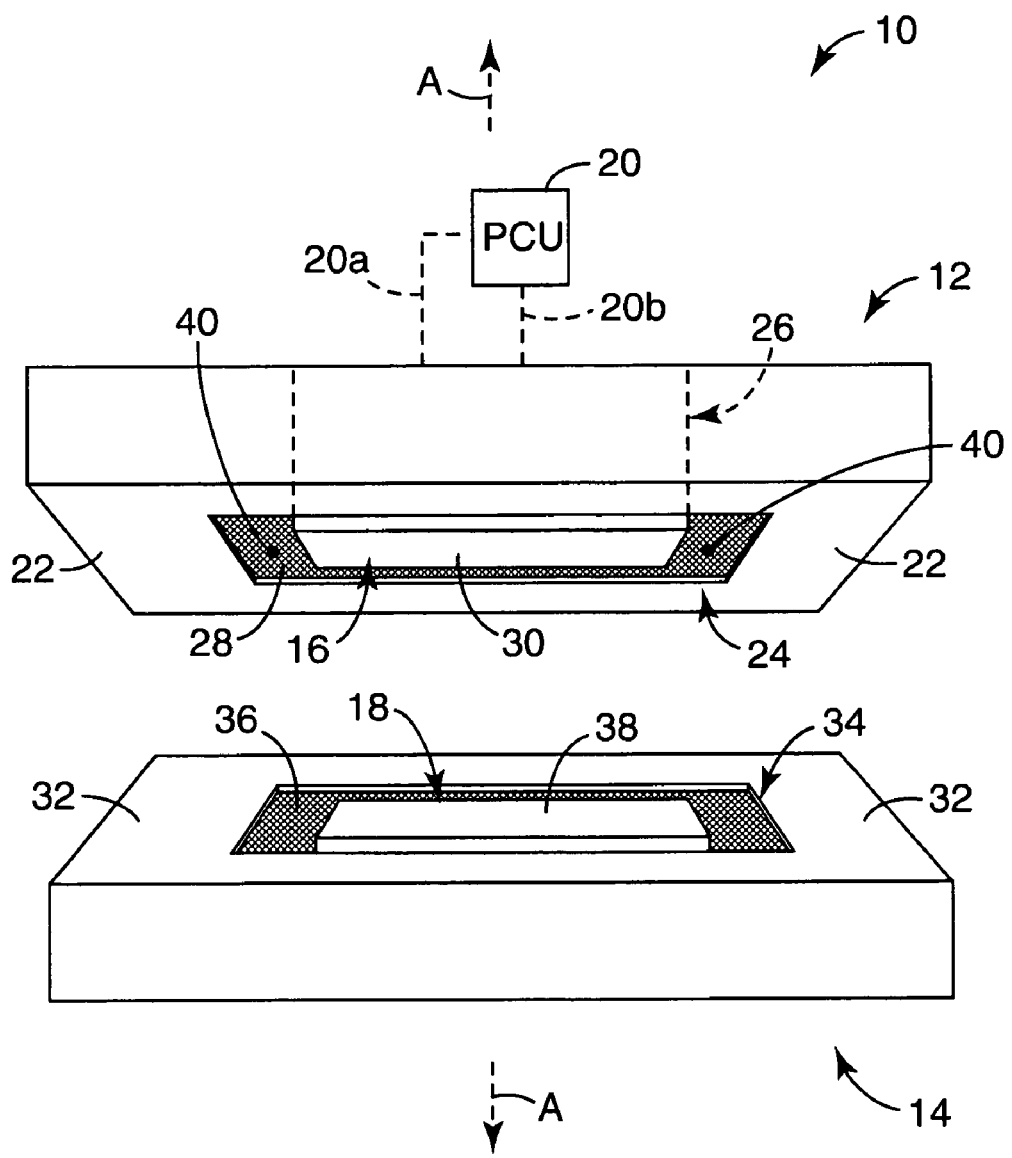
FIG. 1 is an isometric side view of a molding system of the present invention.

FIG. 1 is an isometric side view of molding system 10 of the present invention, which is a suitable system for molding gaskets onto MEAS. As shown, molding system 10 includes top block 12, bottom block 14, mold insert 16, mount 18, and process control unit 20. Top block 12 and bottom block 14 are closable injection mold blocks, where top block 12 is capable of moving along axis A to open and close against bottom block 14 with the use of standard motion systems, such as with hydraulic, mechanical, or pneumatic systems. In an alternative arrangement, bottom block 14 may be the molding block capable of moving along axis A and top block 12 is stationary. Directional orientations such as "top" and "bottom" are used herein for ease of discussion, and are not intended to be limiting.

Top block 12 includes perimeter wall 22, which extends laterally around and defines recessed portion 24. Top block 12 also includes opening 26 (shown in phantom) through which mold insert 16 is movably retained. Recessed portion 24 is a recess within perimeter wall 22 that extends laterally around mold insert 16. Recessed portion 24 includes patterned surface 28, which includes a plurality of replicated patterns to form gaskets having "raised-ridge microstructured contact patterns" and "replicated structures" as disclosed in Wald et al., U.S. Patent Application Publication No. 2003/0211378, and in the pending U.S. Patent Application entitled, "Gasketed Subassembly For Use In Fuel Cells", both of which are commonly assigned.

Mold insert 16 includes contact surface 30, which is a planar surface for applying pressure to an MEA (not shown) retained within molding system 10 during a gasket molding operation. Contact surface 30 of mold insert 16 may include a compliant surface (e.g., a rubber surface) to increase the uniformity of pressure applied across the MEA. Alternatively, contact surface 30 of mold insert 16 may include a perimeter lip (not shown) extending around the lateral edges of contact surface 30. In this embodiment, the central portion of contact surface 30 is recessed from the perimeter lip (e.g., about 200 micrometers or less), and the perimeter lip contacts and applies pressure around the lateral edges of an MEA retained within molding system 10 during a gasket molding operation.

As discussed below, mold insert 16 may move along axis A within opening 26 independently of top block 12. This allows mold insert 16 to independently adjust the pressure applied to an MEA, thereby reducing the risk of over-compressing and under-compressing the MEA. Mold insert 16 may be moved with standard motion systems, such as with hydraulic, mechanical, or pneumatic systems. Such motion systems may communicate with process control unit 20 via signal line 20a. Process control unit 20 is an automated system that monitors the pressure mold insert 16 applies to a given MEA. The applied pressure may be monitored with a force sensor, such as a pressure pad or a load cell (e.g., strain-gauge load cells), which communicates with process control unit 20 via signal line 20b. Process control unit 20 may be any suitable system for controlling the movement of mold insert 16 based on the sensed applied pressure. In alternative embodiments, the motion of mold insert 16 may be manually controlled without the use of process control unit 20.

Bottom block 14 includes perimeter wall 32, which extends laterally around and defines recessed portion 34. Recessed portion 34 is a recess within perimeter wall 32 that extends laterally around mount 18, similar to recessed portion 24. Recessed portion 34 includes patterned surface 36, which includes the same replicated patterns as patterned surface 28. In alternative embodiments, patterned surface 28 and 26 may incorporate differing patterns, or alternatively, one or both of patterned surface 28 and 26 may be free of replicated patterns.

Mount 18 is an insert that is secured to bottom block 14, and is aligned with mold insert 16. In an alternative embodiment, mount 18 may be integrally formed with bottom block 14. Mount 18 includes surface 38 for retaining an MEA during a gasket molding operation. Surface 38 of mold insert 16 may also include a compliant surface (e.g., a rubber surface) to increase the uniformity of pressure applied across the MEA.

As further shown in FIG. 1, top block 12 also includes injection gates 40, which are openings in patterned surface 28 for injecting gasket material. While shown with a pair of injection gates 40, molding system 10 may include a plurality of injection gates at a variety of locations, such as in patterned surfaces 28 and 36, in perimeter walls 22 and 32 (exiting into recessed portions 24 and 34, respectively), and combinations thereof. In one embodiment, injection gates 40 may be located at positions in the resulting gasket where manifold openings will be created (for facilitating gas and/or liquid transport through the gasket).

As discussed below, molding system 10 is suitable for molding gaskets onto MEAs, where mold insert 16 may be adjusted along axis A to reduce the risk of over-compressing and under-compressing the MEAs. This preserves the structural integrity of the MEAs, and improves the connections between the MEAs and the gaskets.

Figure 2:
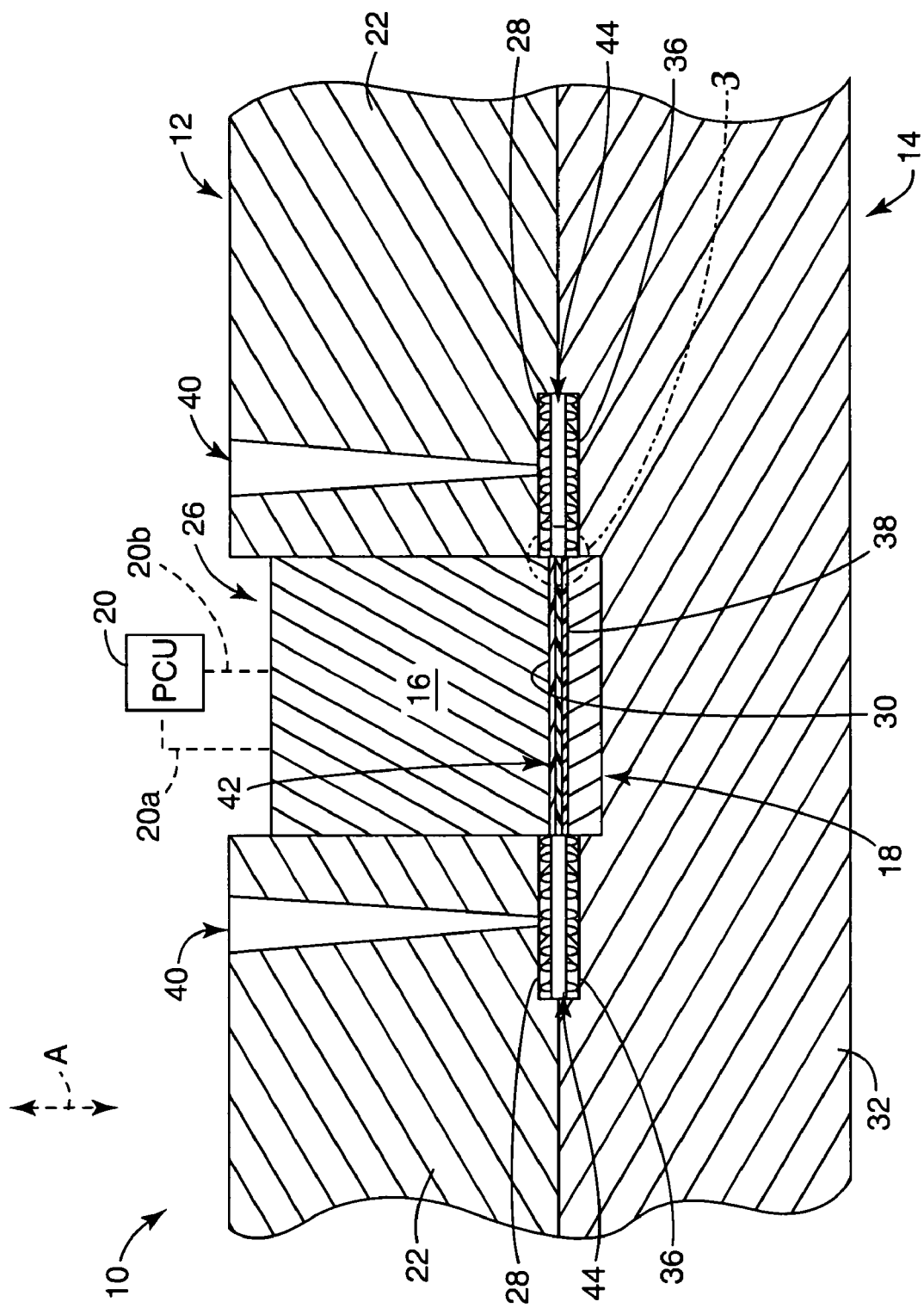
FIG. 2 is a side sectional view of the molding system.

FIG. 2 is a side sectional view of molding system 10, showing top block 12 closed against bottom block 14 with MEA 42 disposed between mold insert 16 and mount 18. For ease of discussion, the thickness of the layers of MEA 42 are exaggerated in FIG. 2. During a gasket molding operation, MEA 42 may be placed on mount 18 in an automated or manual manner. When MEA 42 is retained on mount 18, top block 12 may be closed against bottom block 14 to define cavity 44. Cavity 44 extends laterally around MEA 42 and has a volume corresponding to recessed portions 24 and 34 (shown in FIG. 1). Additionally, when top block 12 closes against bottom block 14, contact surface 30 of mold insert 16 presses against MEA 42, which compresses MEA 42 against surface 38 of mount 18.

Top block 12 closes against bottom block 14 with a preset amount of force to effectively seal perimeter 22 against perimeter 32. This prevents gasket material from exiting molding system 10 during a gasket molding operation. Consequently, if mold insert 16 was affixed to top block 12 (i.e., not independently movable), the relative distance between contact surface 30 of mold insert 16 and surface 38 of mount 18 would be constant for every injection run. This would cause the pressure applied to an MEA retained on mount 18 (e.g., MEA 42) to vary depending on the layer thickness of the given MEA. For example, if a given MEA has a high layer thickness (e.g., 1,000 micrometers), the MEA may be over-compressed, potentially resulting in an electrical short. Alternatively, if the given MEA has a low layer thickness (e.g., 200 micrometers), the MEA may be under-compressed, which may lead to injected gasket material undesirably flowing between the MEA and surfaces 30 and 38.

Mold insert 16, however, is independently movable relative to top block 12 (and bottom block 14). Therefore, the pressure applied by mold insert 16 to MEA 42 may be held constant by adjusting the position of mold insert 16 along axis A. This reduces the risk of over-compressing or under-compressing MEA 42 during a gasket molding operation. Accordingly, while top block 12 closes against bottom block 14, mold insert 16 may move toward mount 18 and MEA 42 along with top block 12. During this time, process control unit 20 monitors the pressure that mold insert 16 applies in real-time.

When mold insert 16 contacts MEA 42, the monitored pressure applied to MEA 42 correspondingly increases. Mold insert 16 continues to compress MEA 42 against mount 18 until a preset, desired pressure is reached. Process control unit 20 then holds MEA 42 at that location relative to bottom block 14 and mount 18, regardless of the movement of top block 12. For example, if MEA 42 has a high layer thickness, mold insert 16 may reach the desired pressure and hold its position before top block 12 reaches bottom block 14. This reduces the risk of over-compressing MEA 42 while top block 12 continues to move toward bottom block 14. Alternatively, if MEA 42 has a low layer thickness, mold insert 16 may continue to compress MEA 42 after top block 12 is sealed against bottom block 14, until the desired pressure is reached. This correspondingly reduces the risk of under-compressing MEA 42.

When top block 12 and bottom block 14 are sealed together, and when mold insert 16 has compressed MEA 42 to the desired pressure, gasket material may be injected into cavity 44 through injection gates 40. Examples of gaskets materials that may be used to form gasket 46 include elastomeric materials, such as rubbers, silicone elastomers, thermoplastic elastomers, thermoset elastomers, elastomeric adhesives, styrene-containing diblock and triblock copolymers, and combinations thereof.

The injected gasket material substantially fills cavity 44 and conforms to the peripheral edges of MEA 42 and patterned surfaces 28 and 36. Upon solidification, the gasket material forms a gasket (not shown), which is secured to the peripheral edges of MEA 42. Additionally, the gasket has replicated patterns formed by patterned surfaces 28 and 36, as discussed above, which improve the sealing efficiency of the gasket.

Figure 3:
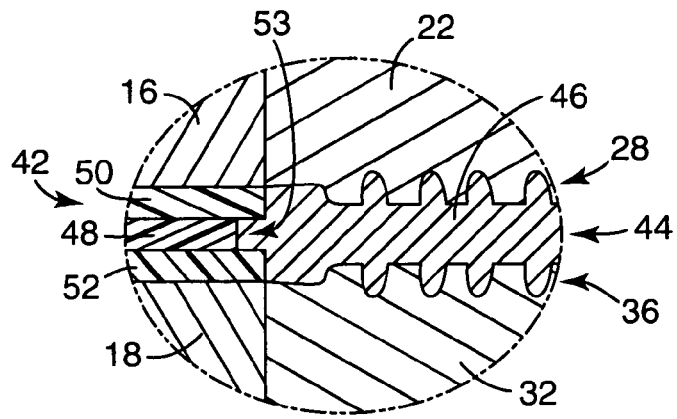
FIG. 3 is an expanded view of section 3 taken in FIG. 2, showing a gasket molded onto an MEA within a cavity of the molding system.

FIG. 3 is an expanded view of section 3 taken in FIG. 2, which shows gasket 46 formed within cavity 44. As further shown in FIG. 3, MEA 42 includes electrolyte membrane 48 disposed between gas diffusion layers 50 and 52, where gas diffusion layers 50 and 52 extend beyond the peripheral edge of electrolyte membrane 48 to define gap 53. When the gasket material is injected into cavity 44, the gasket material penetrates into gap 53 to strengthen the connection between MEA 42 and the resulting gasket 46.

A common issue with injectable gasket materials is that the viscosity and other flow characteristics of a given gasket material may vary significantly between production batches. As a result, the force of the injected gasket material may vary between injections, which may affect how far the gasket material penetrates into gap 53. To account for this, the position of mold insert 16 may be adjusted to correspondingly adjust the pressure applied to MEA 42. This allows the desired amount of gasket material to penetrate into gap 53. For example, if the gasket material has a high viscosity, the pressure that mold insert 16 applies to MEA 42 may be reduced to reduce the force required to penetrate into gap 53. Alternatively, if the gasket material has a low viscosity, the applied pressure may be increased to prevent the high-pressured gasket material from flowing between electrolyte membrane 48 and gas diffusion layers 50/52.

After gasket 46 is molded onto MEA 42, top block 12 and mold insert 16 may open from bottom block 14, and the resulting gasketed MEA 42 may be removed. Gasket 46 extends around the peripheral edges of MEA 42 to prevent pressurized gases and liquids from bypassing electrolyte membrane 48 during use in an electrochemical device (e.g., a fuel cell). Controlling the pressure applied to MEA 42 during the gasket molding operation allows gasket 46 to be securely connected to the peripheral edges of MEA 42 while also reducing the risk of over-compressing and under-compressing MEA 42.

Figure 4:
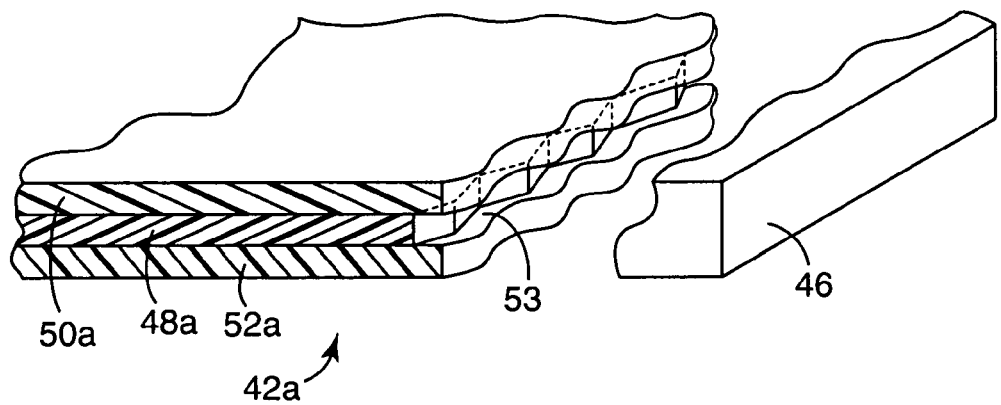
FIG. 4 is a cutaway perspective view of an alternative MEA suitable for use with the molding system, and a gasket molded onto the alternative MEA.

FIG. 4 is a cutaway perspective view of MEA 42*a* and gasket 46, where MEA 42*a* is an alternative design of MEA 42, and includes electrolyte membrane 48*a* and gas diffusion layers 50*a* and 52*a*. As shown, electrolyte membrane 48*a* has a sawtooth-edge profile that extends around the entire peripheral edge of electrolyte membrane 48*a*, within gap 53. The sawtooth-edge profile increases the surface area between MEA 42*a* and gasket 46, thereby further strengthening the connection between MEA 42*a* and gasket 46. When injected into cavity 44, the gasket material penetrates into gap 53, and conforms to the sawtooth-edge profile of electrolyte membrane 48*a*. As discussed above, the pressure that mold insert 16 applies to MEA 42*a* may be adjusted to account for viscosity variations of the injected gasket material. This improves the extent to which the gasket material may penetrate into gap 53 and conform to the sawtooth-edge profile of electrolyte membrane 48*a*.

Figure 5A:
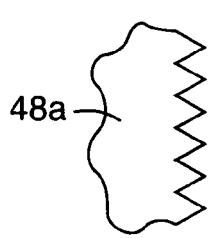
FIGS. 5a-5c are top view illustrations of alternative electrolyte membranes suitable for use with the molding system.
Figure 5B:
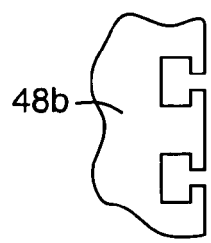
Figure 5C:
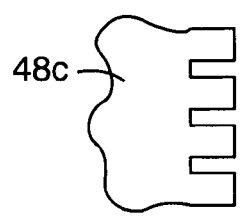

FIGS. 5*a*-5*c* are top view illustrations of electrolyte membranes 48*a*, 48*b*, and 48*c*, respectively, which show examples of suitable edge profiles for MEA 42. In addition to the sawtooth-edge profile shown in FIGS. 4 and 5*a*, suitable edge profiles for electrolyte membranes may include T-indentations (electrolyte membrane 48*b*) and slot indentations (electrolyte membrane 48*c*). Essentially, any edge profile design that increases the contact area between MEA 42 and gasket 46 within gap 53 may be used.

Figure 6:
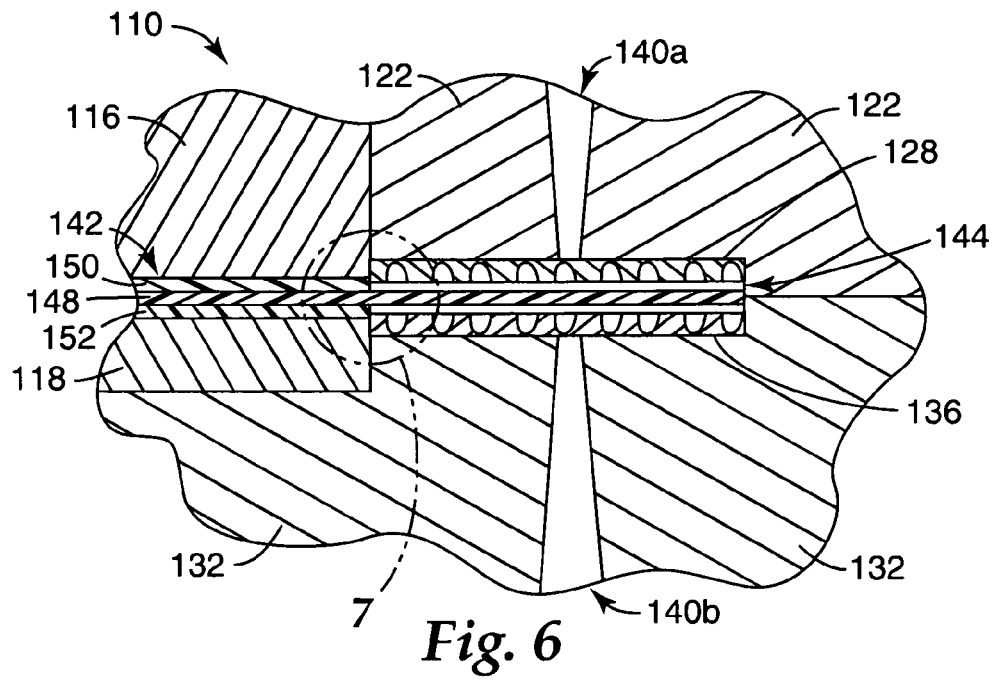
FIG. 6 is an expanded sectional view of a portion of an alternative molding system of the present invention.

FIG. 6 is an expanded sectional view of a portion of molding system 110, which is a system similar to molding system 10 discussed above (corresponding reference labels are increased by "100"). Molding system 110 is suitable for molding gaskets to MEA 142, which is similar to MEA 42, except that electrolyte membrane 148 extends into cavity 144. Electrolyte membrane 148 may include subgasket layers (not shown) disposed on each side of electrolyte membrane 148 to further seal MEA 142 and to provide mechanical support to the portion of electrolyte membrane 148 disposed within cavity 144.

As further shown, molding system 110 includes injection gates 140*a* and 140*b*, where injection gate 140*a* is identical to injection gates 40, discussed above in FIG. 2. Injection gate 140*b* is also similar to injection gates 40, except that injection gate 140*b* extends through bottom block 114. The use of injection gates 140*a* and 140*b* allows gasket material to be injected into cavity 144 from each side of electrolyte membrane 148, thereby forming gaskets (not shown) on each side of electrolyte membrane 148.

Figure 7:
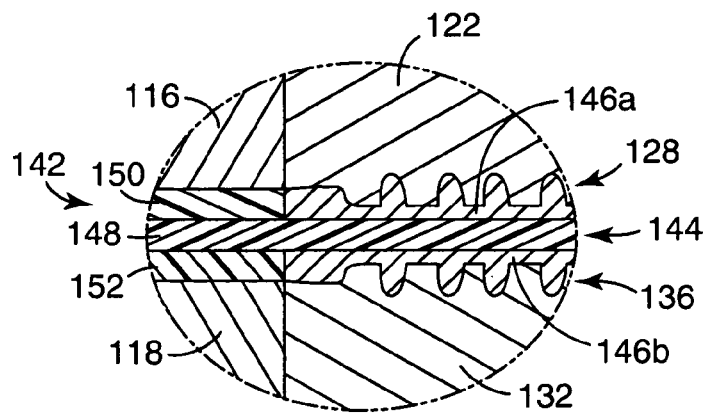
FIG. 7 is an expanded view of section 7 taken in FIG. 6, showing a gasket molded onto an MEA within a cavity of the alternative molding system.

FIG. 7 is an expanded view of section 7 taken in FIG. 6, which shows gaskets 146*a* and 146*b* formed within cavity 144 adjacent the opposing surfaces of electrolyte membrane 148. Upon solidification, gaskets 146*a* and 146*b* are secured to electrolyte membrane 148, and function in the same manner as gasket 46 for preventing pressurized gases and liquids from bypassing electrolyte membrane 148 during use.

Figure 8:
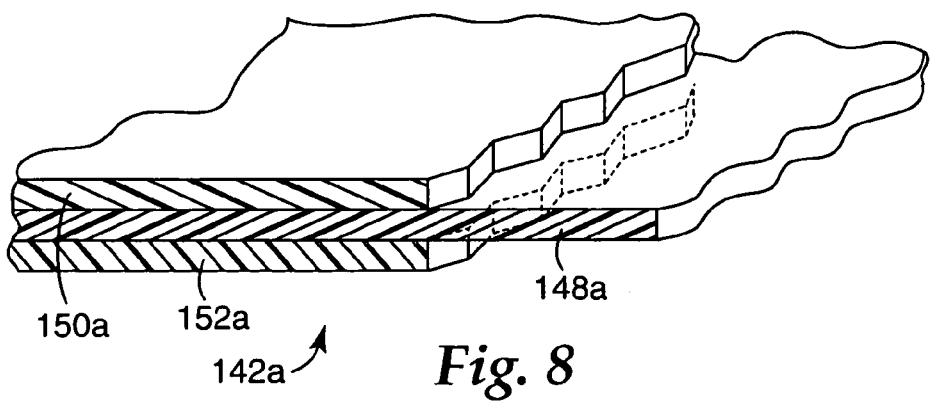
FIG. 8 is a cutaway perspective view of an alternative MEA suitable for use with the alternative molding system, and a gasket molded onto the alternative MEA.

FIG. 8 is a cutaway perspective view of MEA 142*a*, which is an alternative design of MEA 142, and includes electrolyte membrane 148*a* and gas diffusion layers 150*a* and 152*a*. As shown, gas diffusion layers 150*a* and 152*a* each have a sawtooth-edge profile that extends around the entire peripheral edge of MEA 142*a*, which improves the connection between MEA 142*a* and gasket 146. When injected into cavity 144, the gasket material conforms to the sawtooth-edge profiles of gas diffusion layers 150*a* and 152*a*. The pressure that mold insert 116 applies to MEA 142*a* may also be adjusted to account for viscosity variations in the injected gasket materials in the same manner as discussed above. This improves the extent to which the gasket materials may conform to the sawtooth-edge profiles of gas diffusion layers 150*a* and 152*a*. In alternative embodiments, gas diffusion layers 150*a* and 152*a* may incorporate alternative edge profile designs, such as those discussed above for electrolyte membranes 48*a*-48*c* in FIGS. 5*a*-5*c*.

Figure 9A:
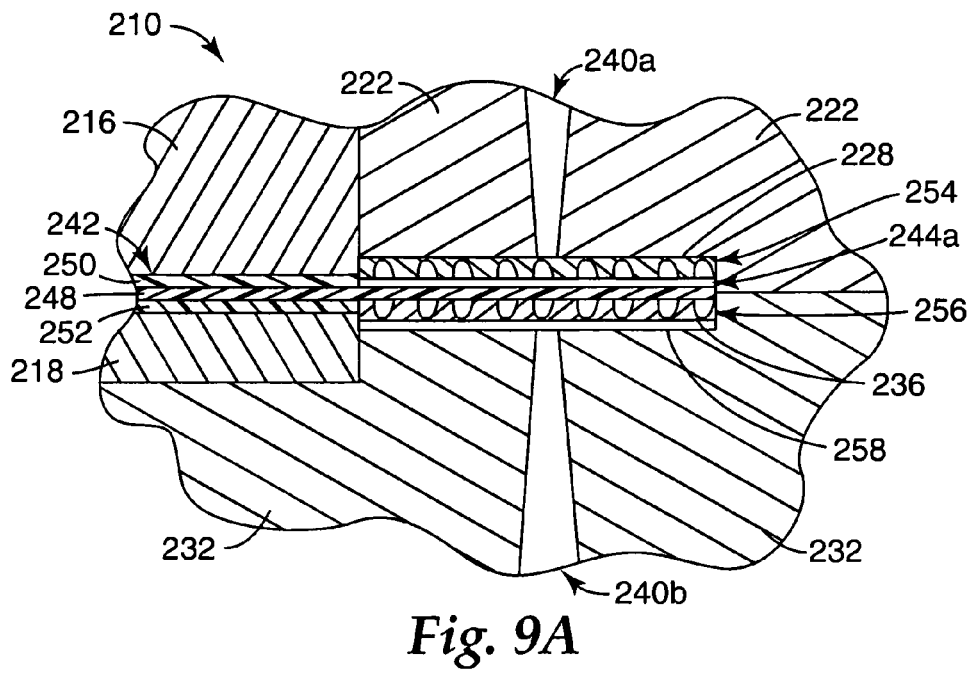
FIGS. 9a and 9b are expanded sectional views of a portion a two-shot molding system of the present invention.
Figure 9B:
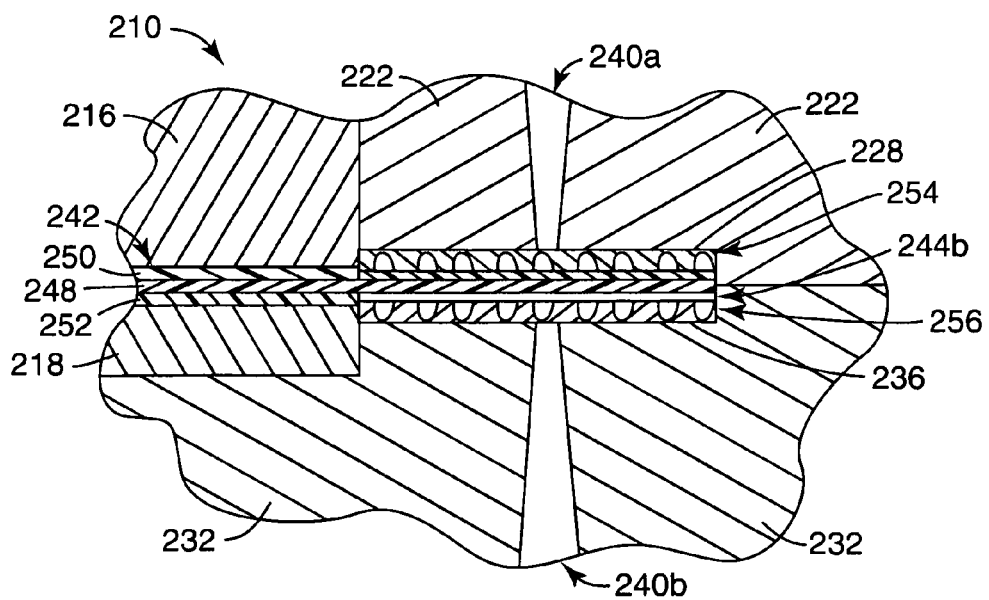

FIGS. 9*a* and 9*b* are expanded sectional views of a portion of molding system 210, which is an alternative system to molding systems 10 and 110 discussed above (corresponding reference labels are increased by "200" from molding system 10). As discussed below, molding system 210 is a two-shot molding system, which injects gasket material on each side of electrolyte membrane 248 of MEA 242.

As shown in FIG. 9*a*, top block 212 and bottom block 214 do not include patterned surface similar to patterned surfaces 28 and 36 of molding system 10. Instead, molding system 210 includes cavity inserts 254 and 256 located on opposing sides of electrolyte membrane 248. Cavity inserts 254 and 256 include patterned surfaces 228 and 236, which function in the same manner as discussed above for patterned surfaces 28 and 36 in FIG. 1.

Cavity insert 254 is secured to top block 212 such that patterned surface 228 faces electrolyte membrane 248 to generally define top cavity 244*a*. Cavity insert 256, however, is movably retained at an offset location within cavity 244 from the surface of bottom block 214 (referred to as surface 258). Cavity insert 256 is offset from surface 258 at a distance that allows patterned surface 236 of cavity insert 256 to support electrolyte membrane 248 during a first injection shot of the two-shot molding process.

While cavity insert 256 supports electrolyte membrane 248, gasket material may be injected into top cavity 244a from injection gate 240a. This substantially fills top cavity 244a and allows the gasket material to conform to electrolyte membrane 248, gas diffusion layer 250 and patterned surface 228. Upon solidification, the gasket material forms a first gasket (not shown), which is secured to electrolyte membrane 248 and gas diffusion layer 250. After the first gasket solidifies within top cavity 244a, cavity insert 256 may be lowered toward surface 258 for injecting gasket material from injection gate 240b. At this point, the first gasket may function as a support for electrolyte membrane 248 while gasket material is injected from injection gate 240b.

As shown in FIG. 9b, when cavity insert 256 is disposed against surface 258, patterned surface 236 and electrolyte membrane 248 generally define bottom cavity 244b. Gasket material may then be injected into bottom cavity 244b from injection gate 240b. This substantially fills bottom cavity 244b and allows the gasket material to conform to electrolyte membrane 248, gas diffusion layer 252, and patterned surface 236. Upon solidification, the gasket material forms a second gasket (not shown), which is secured to electrolyte membrane 248 and gas diffusion layer 252.

Cavity inserts 254 and 256 are suitable inserts for structurally supporting electrolyte membrane 248 during multiple-shot gasket molding operations. This reduces the risk of damaging electrolyte membrane 248 while the individual injections of gasket materials take place.

As discussed above, MEAs may be placed on the mounts of the molding systems 10, 110, and 210 in an automated or manual manner. In one embodiment, the molding system of the present invention may be used in a continuous process, where the MEAs (e.g., MEAs 42, 142, and 242) are fed to the molding system on a carrier belt (not shown) in an automated manner. In this embodiment, the carrier belt may pass directly over the mount (e.g., mounts 18, 118, and 218) for positioning a given MEA on the mount. The top block and the mold insert may then close against the bottom block to perform a gasket molding operation. When completed, the top block and the mold insert may then open from the bottom block. The carrier belt may then remove the gasketed MEA and position a new MEA on mount 18. The process may then be repeated. The molding systems of the present invention are particularly suitable for use with continuous processes because the mold inserts (e.g., mold inserts 16, 116, and 216) may apply a constant pressure to each MEA, despite variations in layer thicknesses between the given MEAs. This reduces the time and effort required to manufacture MEAs.

Although the present invention has been described with reference to preferred embodiments, workers skilled in the art will recognize that changes may be made in form and detail without departing from the spirit and scope of the invention.

The invention claimed is:

1. A system for molding a gasket to a membrane electrode assembly, the system comprising:
   a cavity defined at least in part by closable mold blocks;
   at least one injection gate for injecting gasket material into the cavity;
   a mount for retaining the membrane electrode assembly adjacent to the cavity; and
   a mold insert independently movable relative to the closable mold blocks for applying pressure to the membrane electrode assembly retained on the mount, wherein the mold insert applies pressure around the lateral edges of a membrane electrode assembly retained within molding system.

2. The system of claim 1, wherein the cavity is disposed laterally around the mount.

3. The system of claim 1, wherein the membrane electrode assembly has a perimeter edge, and wherein the mount is configured such that the perimeter edge of the membrane electrode assembly extends into the cavity.

4. The system of claim 1, wherein the applied pressure by the mold insert to the membrane electrode assembly is adjustable.

5. The system of claim 1, further comprising a process control unit for controlling movement of the mold insert, wherein the movement of the mount insert is based at least in part on the pressure applied to the membrane electrode assembly.

6. The system of claim 1, wherein the cavity comprises a plurality of replicated patterns for forming replicated structures in the molded gasket.

7. The system of claim 1, further comprising a movable cavity insert disposed within the cavity.

8. A system for molding a gasket to a membrane electrode assembly, the system comprising:
   a first mold block;
   a second mold block, wherein the first mold block and the second mold block are configured to close together to define a cavity;
   at least one injection gate for injecting gasket material into the cavity;
   a mount secured to the first mold block for retaining the membrane electrode assembly adjacent to the cavity; and
   a mold insert disposed within the second mold block for applying an adjustable pressure to the membrane electrode assembly retained by the mount, wherein the mold insert applies pressure around the lateral edges of a membrane electrode assembly retained within molding system.

9. The system of claim 8, wherein the mold insert is independently movable relative to the first mold block and the second mold block.

10. The system of claim 9, further comprising a process control unit for controlling movement of the mold insert, wherein the movement of the mount insert is based at least in part on the pressure applied to the membrane electrode assembly.

11. The system of claim 8, wherein the applied adjustable pressure adjusts in response to one or more flow characteristics of the gasket material.

12. The system of claim 8, wherein the cavity comprises a plurality of replicated patterns for forming replicated structures in the molded gasket.

13. The system of claim 8, further comprising a movable cavity insert disposed within the cavity.

14. The system of claim 8, wherein the at least one injection gate is disposed at a location corresponding to a manifold opening in the gasket.

* * * * *